Sept. 6, 1966  H. H. HENDON ETAL  3,271,691
RADIATION MONITOR CIRCUIT INCLUDING AMPLIFIER
Filed May 8, 1961  4 Sheets-Sheet 3
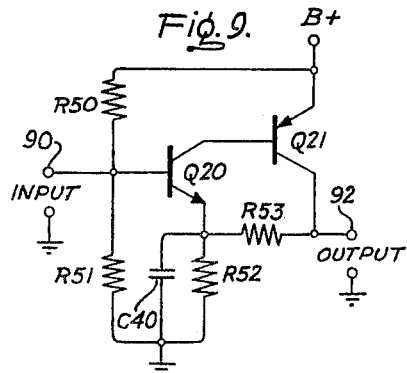
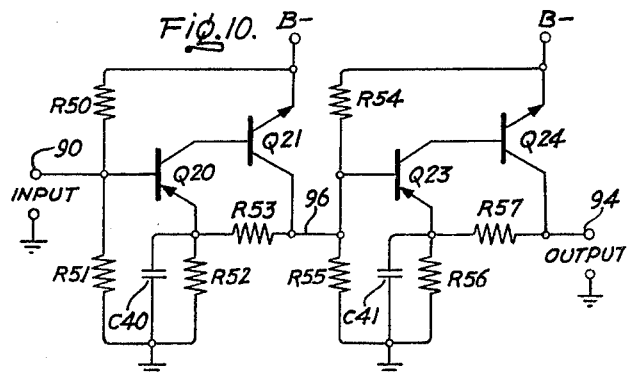
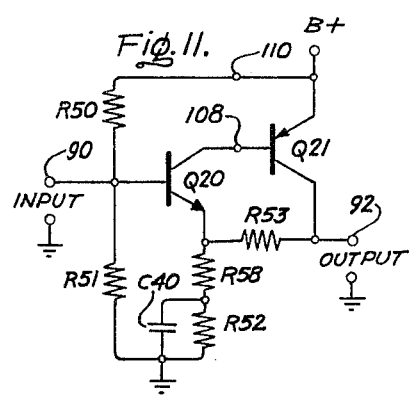
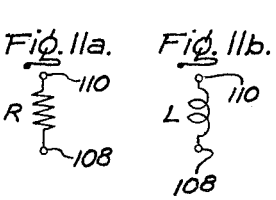
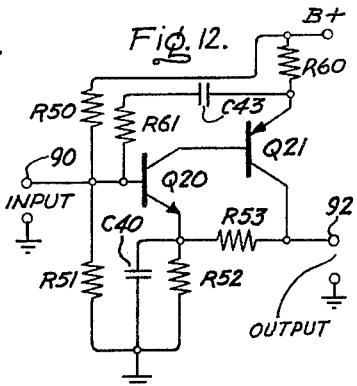
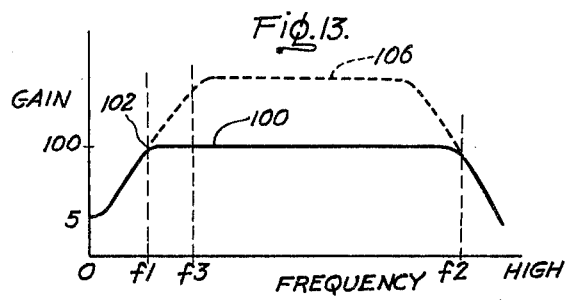
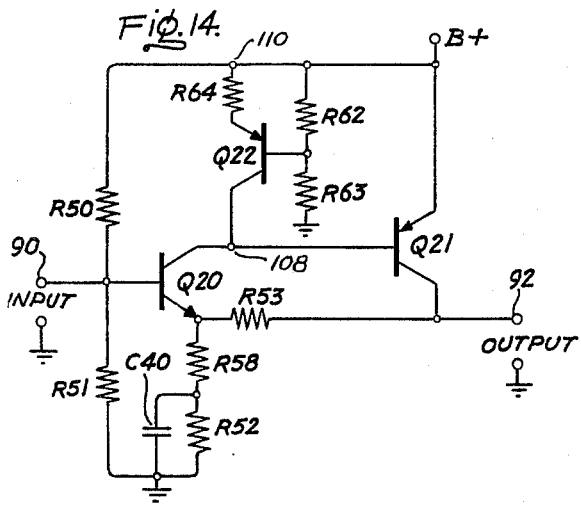
Inventors:
Harry H. Hendon
Louis D. Test,
by *[signature]*
Attorney.

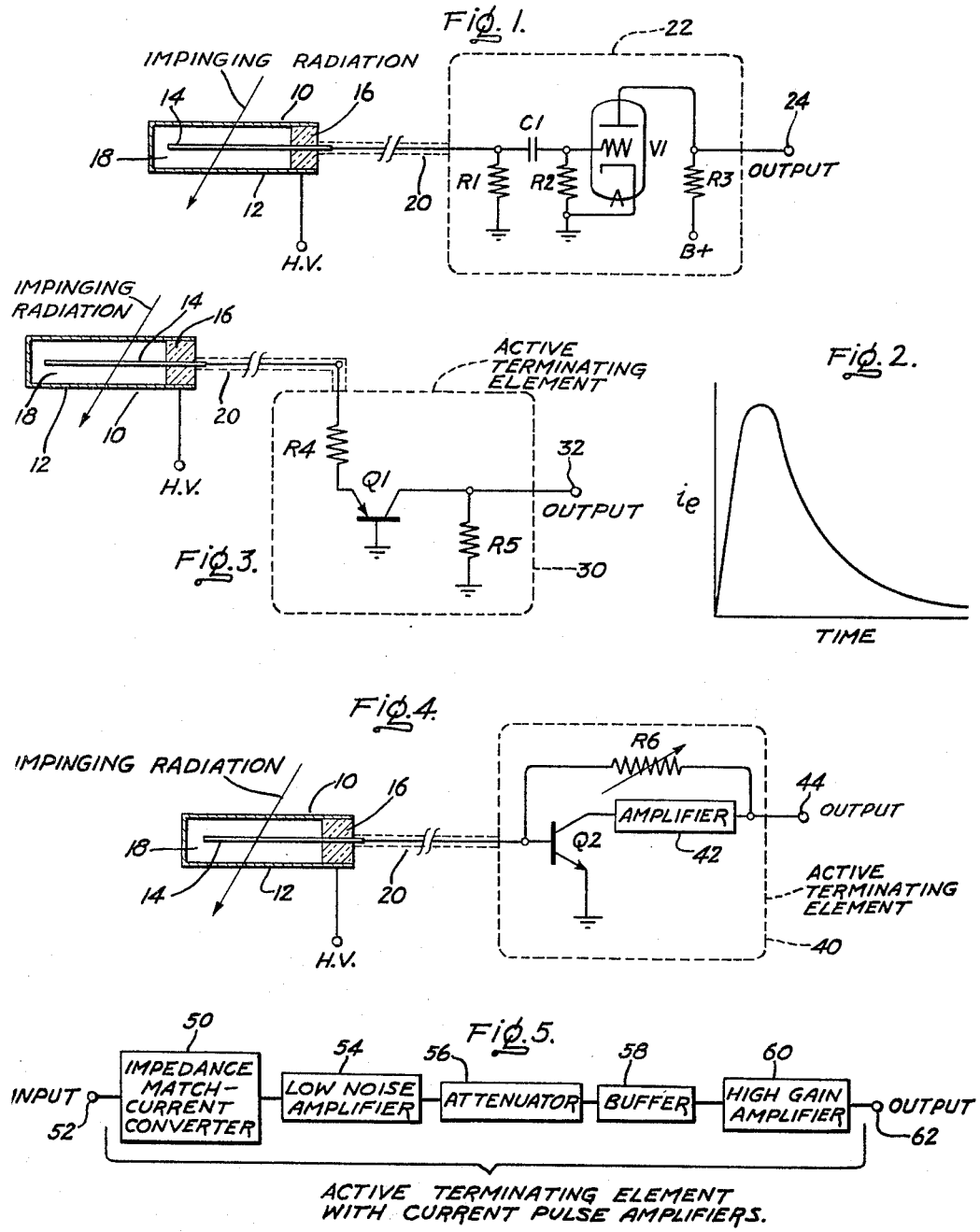

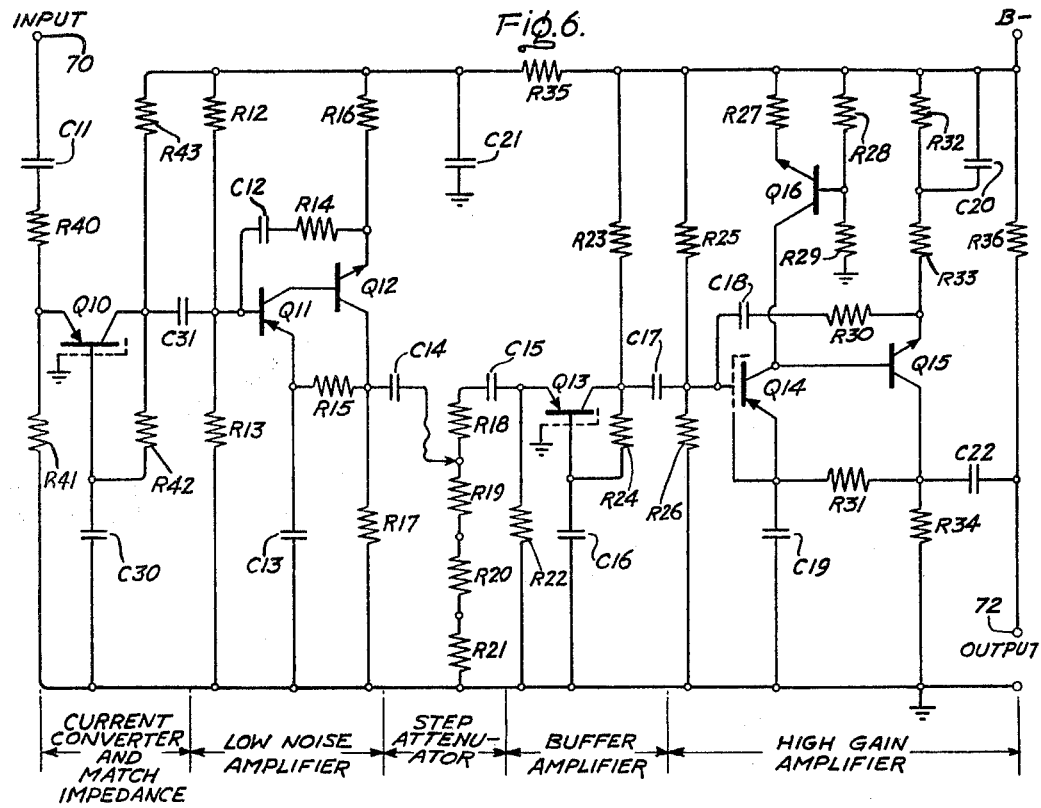

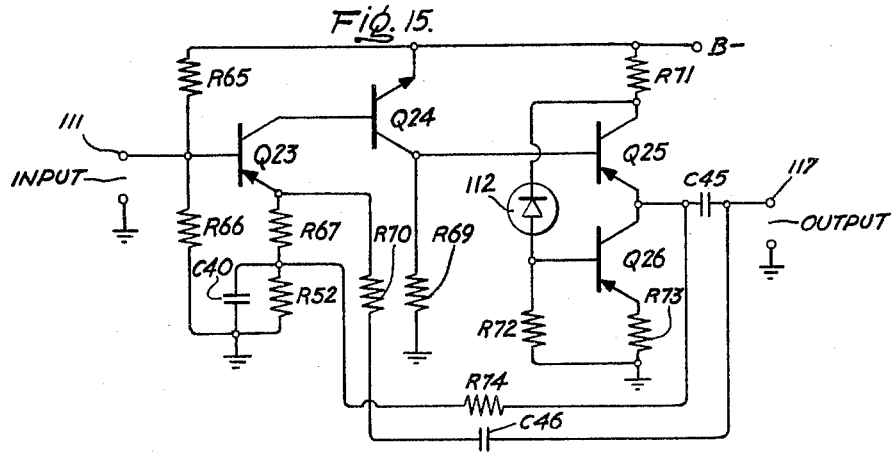
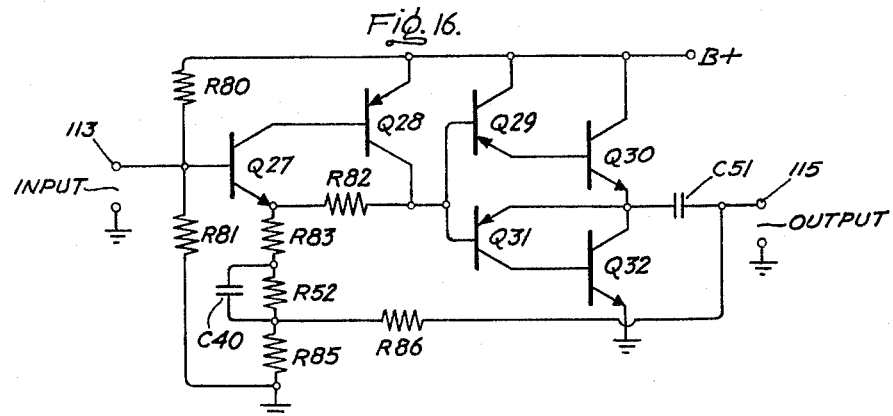
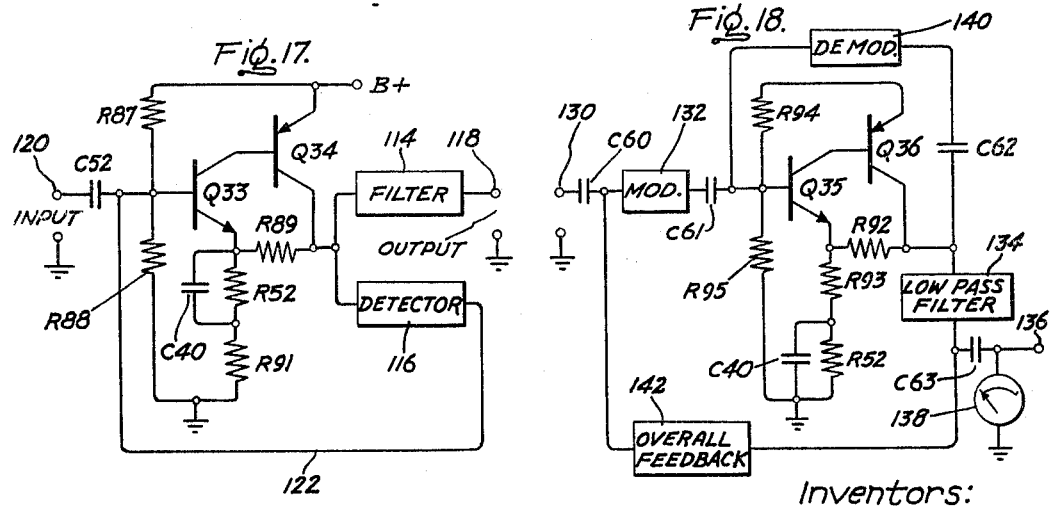
Inventors:
Harry H. Hendon
Louis D. Test,

United States Patent Office 3,271,691
Patented Sept. 6, 1966

3,271,691
RADIATION MONITOR CIRCUIT INCLUDING AMPLIFIER
Harry H. Hendon, Campbell, and Louis D. Test, Santa Clara, Calif., assignors to General Electric Company, a corporation of New York
Filed May 8, 1961, Ser. No. 108,652
11 Claims. (Cl. 330—17)

This invention relates to ionizing radiation monitoring and in particular concerns a new and improved radiation monitor detector and amplifier circuit which overcomes attenuation and noise problems associated with the transmission of signal pulses through long transmission lines and their detection and amplification as voltage signals.

The field of ionizing radiation monitoring includes nuclear reactor control by means of in-core radiation measurement, area or space monitoring where radioactive materials or other sources of high energy particles or waves are present, earth bore logging, and innumerable other specific applications. Various distinctive kinds of radiation are involved including alpha particles, beta particles, gamma rays and neutrons. In any given situation the presence of one or more of these kinds of radiation and their intensity, and sometimes their energy spectrum, are important considerations requiring accurate monitoring of such radiations.

The detectors or sensors currently available and customarily used in radiation monitoring include a very wide variety of devices, all of which are affected in one way or another by the impinging radiation. Most commonly the effect is one of ionization resulting directly or indirectly from the dissipation of energy present in the impinging radiaiton by means of some sensitive medium contained in the detector or sensor. Broadly these sensors include the gaseous discharge, photoelectric, and photoconductive types. Specifically included are such known sensors as ion chambers, fission chambers, scintillation detectors, solid state radiation detectors, photoconductors, photo transistors, photoelectric cells, proportional counters, Geiger-Müller tubes, among others. The operation of each of these various sensors is in general well known and extensively described in the literature, and this will not be further elaborated upon here. However, they do have one property in common when used in conjunction with the normal accessories, and this is the property of producing or generating a current pulse in response to reception of incident radiation of a sufficient energy level. This current pulse consists of a group of electrons traveling from the source of the current pulse substantially at the speed of light along the transmission line or cable connecting the current source with some suitable load. In the present disclosure all of these sensors which produce such current pulses will be referred to generically as current pulse generators.

Additional information concerning radiation sensors and radiation monitoring is collected in Chapter V—Nuclear Reactor Instrumentation, and Chapter IX—Radiation Protection in Principles of Neutron Reactor Engineering, by Glasstone, 1955, published by D. Van Nostrand Co.

Because of the biological and physiological hazards associated with the indiscriminate use of radiation of the type referred to above, the detection and measurement of such radiation generally requires the transmission of the resulting signal from the current pulse generator through some substantial distances to provide for the protection of equipment and personnel. This distant transmission presents a problem because the magnitude of the voltage signal produced by the current pulse generator follows the proportionality $$V \sim \frac{Q}{C}$$

where Q is the quantity of charge produced by a single event and C is the capacitance of the current pulse generator and its associated circuitry including the cable. For maximum signal voltage V, C must be kept to a minimum and this normally requires either the location of the readout equipment or load as closely as possible to the current pulse generator in order to minimize the length of high capacity cable connecting the two, or the use of cable terminating devices such as pulse transformers. Each of these systems involves considerable disadvantage. The problem with the former system is that the amplifying device becomes relatively inaccessible. It may be disposed with the current pulse generator in the field of high radiation level and thus be affected by such radiation. With many kinds of current pulse generators, it is necessary to supply power at fairly high voltages over long cables. In the latter case involving pulse transformers, the nature of the transformers is such that the speed of response of the device is radially reduced due to inductive effects inherent in the transformers.

Attempts have been made [1] to develop cable having a high characteristic impedance to be used with a terminating impedance and a conventional voltage amplifier. The voltage output obtained is proportional to the characteristic impedance of the cable. In order to obtain 50% of the maximum pulse available, it is necessary to use 900 ohm cable which is large, unwieldy, and costly.

Another approach is to regenerate the coaxial cable capacity by driving the outer conductor with a voltage pulse of equal amplitude and phase. Due to finite progation times, this system is limited to cable lengths of the order of 50 feet.

The present invention provides a novel radiation monitoring circuit and amplifier which overcomes all of the disadvantages of the prior art methods described above. It permits, for the first time, the separation of the current pulse generator and the readout circuitry or other load by means of cable whose length is limited only by ohmic considerations, and without substantially reducing the speed of response. It permits the detection and measurement of signals whose equivalent voltages are far below the customary noise voltage signals present in prior art circuits.

Briefly, one aspect of the present invention comprises a current pulse generator to be exposed to a radiation field and to emit a current pulse in response to such radiation, an elongated conductor cable connected at one end to the current pulse generator, and an active terminating element connected to the other end of said cable and having an input transistor stage through which transistor the current pulses directly pass. The active terminating element provides current to voltage conversion for driving voltage sensitive equipment and is provided with means for establishing the input impedance at a value substantially equal to the characteristic impedance of the cable.

Another aspect of the invention comprises a low impedance transmission line active terminating element with a current pulse amplifier, which terminating element includes an input impedance matching transisor stage providing the low input impedance necessary for matching the characteristic impedance of the transmission line and through which transistor the current pulses directly pass, and a two-stage or doublet transistor current pulse amplifier utilizing transistors of opposite polarity in the two stages, means providing D.C. feedback from the collector

---

[1] Baum. J. J.: Transmission of Fission Chamber Pulses Through Long Cables, XDC-60-8-70, pp. 8-10.

of the second stage to the emitter of the first stage to stabilize and fix the operating point of both stages, and means providing negative (out of phase) A.C. feedback to adjust the input impedance and permit high amplification of input signals.

An additional aspect of this invention comprises the doublet amplifier referred to in the preceding paragraph.

Still another aspect of this invention comprises a doublet amplifier utilizing transistors of opposite polarity in the two stages, and having D.C. feedback, from the collector of the second stage to the emitter of the first stage to stabilize and fix the operating point of both transistors.

The present invention and its various embodiments and modifications in comparison to the prior art will be more readily understood by reference to the accompanying drawings in which:

FIGURE 1 is a simple schematic diagram of a prior art radiation monitoring circuit including a current pulse generator, a connecting cable and an amplifier;

FIGURE 2 is a graphic illustration of a current pulse produced by a current pulse generator upon sensing incident radiation;

FIGURE 3 is a simplified schematic diagram of the radiation monitoring circuit of this invention including a current pulse generator, a connecting cable and one form of active terminating element;

FIGURE 4 is a simple schematic diagram of another embodiment of this invention including a current pulse generator, a connecting cable, and another form of active terminating element;

FIGURE 5 is a block diagram of a specific active terminating element including a current pulse amplifier embodying the principles of this invention;

FIGURE 6 is a detailed circuit diagram of the active terminating element referred to in FIGURE 5;

FIGURE 7 is a block diagram illustrating the use of plural active terminating elements in radiation monitoring circuits according to this invention;

FIGURES 8 and 9 are simplified schematic diagrams of the doublet amplifier contained in FIGURE 6, these figures showing the use of different transistor types in each amplifier;

FIGURE 10 is a simplified schematic diagram of an amplifier consisting of two doublet amplifiers arranged in cascade;

FIGURE 11 is a simplified schematic diagram of the FIGURE 9 doublet amplifier provided with one form of A.C. feedback;

FIGURES 11a and 11b illustrate shunts for incorporation in the circuit of FIGURE 11;

FIGURE 12 is a simplified schematic diagram of the FIGURE 9 doublet amplifier provided with an alternative form of A.C. feedback;

FIGURE 13 is a plot of gain as a function of frequency for the doublet amplifiers of this invention;

FIGURE 14 is a schematic diagram of the doublet amplifier of FIGURE 11 provided with means for shunting the amplified quiescent signal from the first stage to prevent thermal damage to the second stage transistor in the amplifier;

FIGURE 15 is a schematic circuit diagram of a power amplifier embodying the doublet amplifier of this invention;

FIGURE 16 is a schematic circuit diagram of a class B push-pull amplifier embodying the doublet amplifier of this invention;

FIGURE 17 is a schematic diagram of a reflex amplifier system embodying the doublet amplifier of this invention;

FIGURE 18 is a schematic circuit diagram of a second reflex amplifier system acording to this invention.

In FIGURE 1 a simple prior art circuit is given. Current pulse generator 10 is shown as an ion chamber including outer electrode 12, inner electrode 14, and insulating means 16. An ionizable gas such as nitrogen is contained in region 18. Cable 20, ordinarily a coaxial cable, connects current pulse generator 10 to amplifier 22 whose single stage V1 consists of an RC input amplifier. Stage V1 includes coupling capacitor C1, grid bias resistor R2, and load resistor R3. Line terminating resistor R1 is connected between ground and the output end of cable 20 and by means of which the current pulse flowing from the generator is converted to a voltage pulse. The voltage pulse is coupled to amplifier stage VI by means of a differentiating circuit comprising C1 and R2. In the conventional way, the voltage pulse generated in R1 is transmitted to the control grid of stage V1 thereby modifying the control grid voltage and producing a corresponding pulse type change in the current flow through plate load resistance R3. The higher output voltage pulse may be used to drive an indicator, or further amplifiers.

Since the current pulses generated in generator 10 are quite small, a high resistance R1 is required to produce signal voltages which can be distinguished from circuit noise. Usually a value of about 15K (15,000 ohms) is sufficient. Cable 20 must be kept short to minimize the adverse capacitive effects referred to above.

The elimination of capacitive effects in a transmission line by terminating the line in its characteristic impedance is well known. The capacitive effects of cable 20 in FIGURE 1 may be reduced if not eliminated in this conventional prior art circuit by making R1 equal to the characteristic impedance of $Z_0$ of cable 20. This, however, is ineffective in the FIGURE 1 circuit since the resulting voltage pulse is undetectable. For example, assume that the characteristic impedance $Z_0$ of cable 20 is 75 ohms. Current pulses on the order of $1 \times 10^{-8}$ amperes are customarily produced in current pulse generators used in radiation monitoring. R1 is made equal to 75 ohms. Applying Ohm's law ($E=I\times R$), the resultand voltage pulse produced in R1 is equal to $0.75 \times 10^{-6}$ volts. This minute voltage is far too low to be detected by the conventional amplifiers, and is well down into the circuit noise which, in such amplifiers, averages 10 to 20 microvolts, or between 10 to $20 \times 10^{-6}$ volts. All but the very heaviest incident radiation is undetectable by the circuit shown in FIGURE 1 when modified in this way from the usual prior art circuitry to eliminate the capacitive effects of the cable and permit wide separation between current pulse generator 10 and amplifier 22. Even with the special high impedance cable referred to above (900 ohm $Z_0$), the voltage pulses merely approach the lower limit of the average noise level.

In FIGURE 2 is shown a simple time plot of the current produced by a current pulse generator, such as element 10 shown in FIGURE 1, as a function of time following the arrival of the incident radiation and resulting from the liberated charge $dQ$ in the current pulse generator. In the present invention, and unlike the prior art system referred to in FIGURE 1, the pulse of electrons moving along the cable is not dissipated in a terminating resistance such as R1 equal to the characteristic impedance of the cable. On the contrary, the current pulse is introduced directly into the input stage of an active terminating element whose input is responsive to current pulses rather than voltage pulses, and through which stage this current pulse passes directly. A device which is responsive to such current pulses is a transistor. In the device of the present invention therefor, current pulses originating in the current pulse generator and transmitted over substantial distances through a conducting cable are passed directly and in a series through a normally low impedance path in the input transistor and are grounded. The input impedance of the stage is made equal to the characteristic impedance of the cable. One embodiment of this invention is shown in FIGURE 3.

In FIGURE 3 current pulse generator 10 is again shown including the same specific elements referred to previously, and is connected by means of coaxial cable 20 to an active terminating element 30 embodying the principles of this invention. In this modificaton the active terminating element is a device having a current gain which is equal to or slightly less than one, but which converts minute input currents to substantial output voltages while terminating the cable in its characteristic impedance $Z_0$. The active terminating element includes transistor Q1 connected in grounded base configuration and whose emitter electrode is connected in series with resistance R4 with the output end of cable 20. The transistor may be either PNP or NPN type, with suitable change in power supply polarity. Load resistor R5 is provided in the collector electrode circuit. The output signal appears at terminal 32.

In this circuit, cable 20 is terminated in its characteristic impedance made up of the serially connected resistance R4 and the input impedance of transistor Q1 existing between its emitter and base electrodes. The capacity effect of the cable is thus eliminated since $$R4 + h_{ib} = Z_0$$

The current pulse $i_e$ of about $1 \times 10^{-8}$ amperes flowing through cable 20 is grounded through R4 and the emitter-base circuit of transistor Q1. The current gain $\alpha$ for a type 3553A transistor in this configuration is about 1. The output current in the collector circuit is therefore equal to $(\alpha)(i_e)$ or $1 \times 10^{-8}$ amperes. However, the output voltage is equal to $(\alpha)(i_e)(R5)$. For a transistor of the type given, the load or output resistance R5 is usually about 100K, and the output voltage for a current pulse of about $10^{-8}$ amperes becomes $10^{-4}$ volts or 0.4 millivolt. Comparing this voltage signal with the usual noise voltages of 10 to $20 \times 10^{-6}$ volts, the resultant output voltage of the present invention as shown in FIGURE 3 is seen to be 5 to 10 times higher than the noise voltages, and is 50 to 200 times greater than the voltage pulses generated in R1 of FIGURE 1, the conventional prior art circuit. These signals are therefore readily detectable without resorting to elaborate circuitry to differentiate them from the noise.

The active terminating element above described in FIGURE 3 is particularly useful in the circuit shown and applied to radiation monitoring where the length of coaxial cable 20 is immaterial. The terminating element is also useful in other services by itself, such as at the input of a radio frequency receiver, at the input end of a voltage amplifier, and in other applications. Some of these are further described below.

Referring now more particularly to FIGURE 4, a second embodiment of the present invention is shown in which an alternative active terminating element is used. Here current pulse generator 10 having the same elements as previously described, is connected by means of an elongated coaxial cable 20 to the alternative active terminating element 40. This active terminating element includes input transistor stage Q2 connected in grounded emitter configuration and provided with a current pulse amplifier 42 connected to output terminal 44. Transistor stage Q2 has current gain because the input current pulse $i_e$ discharges through the base-emitter circuit to ground and the output signal current in the collector circuit flows through this same base-emitter circuit. Amplifier 42 also provides further current gain.

Transistor Q2 connected in this configuration has a base to emitter internal impedance $h_{ie}$ of about 1400 ohms through which the input current pulse must pass to ground. In such a case, cable 20 would not be terminated in its characteristic impedance were it not for the provision of negative A.C. feedback circuit including R6 connected from the output of amplifier 42 to the input to transistor Q2. The feedback so provided is made sufficient to adjust the effective input impedance to stage Q2 to a value equal to the characteristic impedance $Z_0$ of cable 20. The value of resistance R6 necessary in a given case to provide an effective impedance at the input of transistor Q2 which is equal to the characteristic impedance of cable 20 may be determined from the following relation.

$$Z_0 = \frac{h_{ie}}{1 - \left(\frac{\alpha}{1-\alpha}\right)(-A)\left(\frac{h_{ie}}{h_{ie}+R6}\right)}$$

which may be reduced to:

$$R6 = \frac{\left(\frac{\alpha}{1-\alpha}\right)(-A)(h_{ie})(Z_0)}{Z_0 - h_{ie}} - 1$$

where $\alpha$ is the current gain value for the transistor involved, $Z_0$ is the characteristic impedance of cable 20, $-A$ is the current gain of the stage or stages in amplifier 42, and $h_{ie}$ is the base-emitter internal impedance for the transistor selected.

In FIGURE 5 is shown a block diagram of the circuit diagram of FIGURE 6 and described subsequently. The FIGURE 5 block diagram comprises a more elaborate active terminating element with current pulse amplifier suitable for use in radiation monitoring. The five principle components include impedance matching and current conversion stage 50 into which the input signals are introduced by means of connection 52, a low noise current pulse amplifier 54, an attenuator 56, a buffer amplifier 58, and a high gain current pulse amplifier connected to output connection 62. The impedance matching stage 50 is the active terminating element of the type illustrated as item 30 in FIGURE 3. It is operated at low collector currents. Amplifier 54 is a low noise doublet amplifier of novel design and serves to increase the output voltage of stage 50. Attenuator 56 is included to provide attenuation ratios as desired for any given service, the purpose being simply as a gain control for the system. Buffer stage 58 provides isolation between the attenuator 56 and the output amplifier stage 60. Amplifier 60 provides additional current gain and is essentially equivalent to amplifier stage 54.

Referring now more particularly to FIGURE 6, a schematic diagram of an active terminating element including current pulse amplifier according to the present invention is shown. It corresponds in circuit functions to the block diagram shown in FIGURE 5. The circuit in FIGURE 6 will be described in terms of function, actual component values for one embodiment of the present invention suitable for radiation monitoring being given following the description of FIGURE 6 in Table 1. This particular circuit is adapted to be connected at its input terminal 70 to a low impedance line such as a coaxial cable leading from current pulse generators as previously described. It includes an input transistor stage Q10 which is essentially a unity gain current amplifier, but does convert input current pulses to a voltage signal and provides a substantial voltage gain. The portion of this stage which is the effective termination impedance of the cable is the series circuit made up of resistance R40 and the emitter-base path through transistor Q10. As discussed before with respect to FIGURE 3, resistance R40 is determined by the following:

$$R40 = Z_0 - h_{ib}$$

Capacitors C10 and C30 do not alter the impedance of this path substantially since they present only negligible impedances to the very high frequency A.C. signal pulses. Resistance R41 is provided to bias Q10 and supply its quiescent operating current. Its high resistance relative to $h_{ib}$ has substantially no effect on the low impedance input presented at the cable termination.

The current converter and impedance matching stage Q10 operates through blocking capacitor C31 directly into a two transistor stage low noise amplifier consisting of transistors Q11 and Q12. This is a doublet amplifier having high operating point stability due to the action of D.C. feedback network consisting of R15, R17 and C13 and which provides 100% D.C. feedback in this application. Linearity and stability of A.C. operation of this amplifier, that is, the amplification of the input pulse signals, are insured by a second feedback network including R14, R16 and C12. This A.C. feedback also permits current amplification to take place by effectively lowering the input impedance of stage Q11 to a relatively low value (on the order of 300 ohms) to match the output impedance of stage Q10. Such A.C. feedback can be utilized to match the input of stage Q11 directly to a cable, if desired, in the manner shown in FIGURE 4. An additional advantage of this configuration is the substantial reduction of internal noise and the external noise pickup by reducing the input impedance level. Resistances R12, R13, and R16 are provided to apply the proper D.C. bias to stages Q11 and Q12. The output signal is taken from the collector electrode Q12 through coupling capacitor C14 and is further amplified as described below.

This amplifier, which will be noted to be substantially identical to the high gain amplifier including stages Q14 and Q15 subsequently described, has been found to be particularly well adapted to this service. It also has been found to be capable of wide application as a high stability amplifier in audio-video, and other services. The key distinguishing features of this amplifier are the use of opposite transistor types in a two-stage or doublet amplifier, a D.C. feedback connection provided from the collector of the second stage to the emitter of the first stage, and in some cases an A.C. feedback connection separately provided to fix the input impedance of the amplifier and provide linearity and high stability in amplification service.

A step attenuator consisting of resistances R18, R19, R20, and R21, is provided at the output of the low noise amplifier. If desired, potentiometer type attenuation may be provided here. This unit is effectively a gain control for the amplification provided by the FIGURE 6 circuit. The output of the step attenuator is fed through coupling capacitor C15 to the input stage of a buffer amplifier Q13 also having a low input impedance.

Buffer amplifier Q13 provides isolation between the attenuator and the following high gain amplifier stages. The buffer amplifier circuit is substantially identical to the current converter and impedance matching stage Q10 except for small differences in the values of capacitor C16. The output of buffer amplifier Q13 operates through a coupling capacitor C16 to the input of high gain amplifier including stages Q14 and Q15.

The high gain amplifier Q14 and Q15 is, as previously indicated, substantially identical to the low noise amplifier Q11 and Q12 previously described. The only substantial difference involves the presence of current shunt stage Q16. It is often convenient to pass a moderate current through the input stage of this doublet amplifier, here Q14. Since the current flow in Q15 is equal to $\beta 15$ times the Q14 current, this current can become impractically large, and may cause excessive dissipation at the Q15 collector. Stage Q16 provides a current shunt for a substantial part of this current without seriously affecting signal currents, because the collector impedance of Q16 to D.C. is low while that to A.C. is quite large. For example, this impedance to A.C. pulse signals can be readily made 50 to 100 times that of the base impedance of Q15. In the shunt stage Q16 resistances R27, R28, and R29 are provided to set the proper operating bias on the transistor. The amplified current pulse signal is delivered from the collector of stage Q15 through coupling capacitor C22 to output terminal 72. Resistance R36 is provided to supply quiescent operating current through a long cable to another active terminating element as shown in FIGURE 7. It may be eliminated where the FIGURE 6 system is closely connected to a suitable load.

Component values for the circuit in FIGURE 6 are given below in Table 1. Such a circuit is specifically designed for the radiation monitoring service described above in connection with FIGURE 3. It should be understood that this circuit constitutes a specific embodiment of the active terminating element and amplification equipment discussed above in FIGURE 3 as active terminating element 30.

TABLE I

*Transistors*

| | |
|---|---|
| Q10 | 3553A |
| Q11 | 2N345 |
| Q12 | 2N1289 |
| Q13 | 3553A |
| Q14 | 3553A |
| Q15 | 2N1289 |
| Q16 | 2N1289 |

*Resistances*

| | |
|---|---|
| R12 | 8.2K |
| R13 | 36K |
| R14 | 1.5K |
| R15 | 3.9K |
| R16 | 100 |
| R17 | 2K |
| R18 | 120 |
| R19 | 75 |
| R20 | 33 |
| R21 | 33 |
| R22 | 3.3K |
| R23 | 1.5K |
| R24 | 200K |
| R25 | 75K |
| R26 | 24K |
| R27 | 5.6K |
| R28 | 5.1K |
| R29 | 15K |
| R30 | 7.5K |
| R31 | 1K |
| R32 | 1K |
| R33 | 100 |
| R34 | 510 |
| R35 | 1K |
| R36 | 3.3K |
| R40 [1] | 30 |
| R41 | 3.3K |
| R42 | 200K |
| R43 | 1.5K |

*Capacitances*

| | |
|---|---|
| C11 | 0.05 |
| C12 | 0.1 |
| C13 | 10 |
| C14 | 0.1 |
| C15 | 0.1 |
| C16 | 0.0027 |
| C17 | 0.1 |
| C18 | 0.1 |
| C19 | 10 |
| C20 | 10 |
| C21 | 0.0027 |
| C22 | 0.1 |
| C30 | 0.001 |
| C31 | 0.1 |

[1] $R40 = Z_0$ of cable, minus $h_{ib}$ of Q10.

The output of the impedance matching or active terminating element and amplification system described in FIGURE 6 is not very high and it is therefore not appropriate to be connected directly to high input impedance readout equipment including recording, display, or control instruments. Such a connection may be made through an active terminating element as shown in FIGURE 3. Due to its low output impedance, the terminating element of FIGURE 6 can operate directly into a suitable low impedance cable for connecting it to other equipment located in remote points. Such cable can also be terminated by means of an active terminating element corresponding to stage Q10 in the circuit shown in FIGURE 6, or the circuits of FIGURES 3 and 4, for the same purposes as described above, namely impedance matching and current to voltage conversion. The output of such an active terminating element is connected by means of reasonably short cable lengths to the higher input impedance recording, display, or control equipment referred to above.

Such a system is shown in FIGURE 7. Here current pulse generator 10 is connected by coaxial cable 20 to first active terminating element 80, the device of FIGURE 6 for example. This element 80 is connected by means of a long coaxial cable 82 to a second active terminating element 84, which in turn is connected by a short length cable 86 to readout equipment 88 such as a log count rate meter or scaler, or the like, whose input impedance is relatively high, usual values being on the order of 25K. Second active terminating element 84 in this service can correspond to the single stage element shown in FIGURE 3, and can be an integral or accessory part of readout equipment 88.

As pointed out above, the doublet amplifiers used in two places in the current pulse amplifier of FIGURE 6, have general application apart from this particular application. This amplifier is applicable to advantage in high frequency pulse amplifier applications and other high frequency amplifier uses, such as a video applications, as well as in audio frequency amplifying service. These and other applications of this doublet amplifier are further described in detail in connection with the following figures.

In the present application, and particularly in the following discussion of A.C. feedback in the doublet amplifier of this invention, A.C. is defined as alternating current energy having a frequency $f3$ in cycles per second at least equal to $$f3 = \frac{10}{(2)(\pi)(R_{eq.})(C)}$$

where $R_{eq}$ and $C$ are the equivalent resistance in ohms and the capacitance in farads of the parallel RC network connected in the emitter circuit of the first stage of the amplifier. $R_{eq}$ is determined, in the circuit of FIGURE 11 for example, from:

$$R_{eq} = \frac{(R_{52})(h_{ib})}{(R_{52}+h_{ib})}$$

and where $h_{ib}$ is the transistor characteristic for stage Q20.

Referring now to FIGURES 8 and 9, identical schematic circuit diagrams of the doublet amplifier of this invention are shown in its most basic form, i.e., a fed back D.C. amplifier. The sole distinction between these figures is the polarity of the transistors employed. In either circuit, however, it would be noted that input and output stages are of opposite polarity types, and both are connected in common emitter configuration. The input signal is fed to the base of the first stage, and the collector of the first stage is directly connected to the base of the second stage. The circuit is in essence identical to that employed in the low noise amplifier and the high gain amplifier described above with respect to FIGURE 6. Resistances R50 and R51 are provided to apply proper D.C. bias to the input stage Q20 and also to provide a reference voltage in the input. D.C. feedback is provided by resistances R52 and R53 to provide the high stability of operating point of this doublet amplifier. No A.C. feedback is employed in this embodiment of the invention, capacitor C40 shunting to ground any A.C. signal voltage as may otherwise be returned to the input stage through resistance R53. The voltage gain of these amplifiers is therefore very close to 1, but the current gains may be made quite high, on the order of about 1000. The input current signals in each case are applied at input connection 90 and the output current signal appears at connection 92. In FIGURES 8 and 9, because of the different polarity types of transistors used, the supply voltage is necessarily made negative with respect to ground in FIGURE 8 and positive with respect to ground in FIGURE 9.

Referring now to FIGURE 10, a cascade arrangement of two doublet amplifiers according to this invention is shown, the doublet amplifiers selected each being specifically that shown in FIGURE 8. This amplifier consists of first doublet amplifier including stages Q20 and Q21 and an added doublet amplifier consisting of stage Q23 and Q24. No A.C. feedback is employed in the stages due to capacitors C40 and C41. The D.C. feedback in each doublet amplifier is provided by means of resistances R52 and R53 in the first stage, and by R56 and R57 in the second stage. Operating bias setting resistances R50 and R51 in the first stage and R54 and R55 are provided as above described. The input signals are applied at terminal 90, and the output signal appears at terminal 94. The collector of output stage Q21 is directly connected by means 96 to the base of input stage Q23 in the second doublet. The direct coupling is permitted in this cascade arrangement by arranging the input D.C. voltage of the second doublet amplifier to be the same as the output voltage of the first doublet amplifier. This is permitted according to this invention by the use of opposite transistor types in the alternate stages of this four-stage amplifier. As indicated before, the circuit works equally well with PNP or NPN input transistors, and with NPN or PNP output transistors respectively in each of the doublet amplifiers.

In FIGURE 11 is a schematic circuit diagram of the doublet amplifier of this invention modified to provide for negative A.C. feedback and therefore to provide increased input impedance, voltage gain, and power gain if desired. The circuit shown is a modification of that discussed previously in FIGURE 9. The modification concerns the addition of R58 in series between the Q21 emitter and the parallel R52–C40 circuit, previously discussed. The A.C. signal fed back from output stage Q21 through resistance R53 to the emitter of input stage Q21 appears across resistances R58 and R52, R52 is bypassed to ground, and the A.C. voltage developed in R58 is effectively applied to input stage Q20.

This amplifier has its band pass essentially cut into frequency bands, one below the input stage Q20 emitter cut off frequency $f1$ and the second band above that frequency. The forward gain is different in each of these two bands. The low frequency band is used to control the operating point of the transistors by applying a voltage reference at the input base. Specifically, in the amplifier of FIGURE 11 the lower band pass portion is at frequencies in cycles per second below $f1$ where $$f1 = \frac{1}{(2\pi)(R_{eq})(C42)}$$

where $R_{eq}$ has been defined above. This is the upper half power point of the emitter, emitter resistor-capacitor combination. The forward gain in this lower pass band is equal to $$\frac{(R53+R58+R_{eq})}{(R58+R_{eq})}$$

This ratio is made fairly low, such as about 2. The loop gain on the other hand is rather high, being equal to $$(\alpha 20)(\beta 21)$$

where $\alpha 20$ is the emitter-collector current gain of Q20 and $\beta 21$ is the base-collector current gain of Q21. This means that the voltage appearing at the emitter of input stage Q20 is regulated closely to a constant value controlled by the voltage at the base of Q20 set by resistances R50 and R51. The circuit at low frequencies thus acts somewhat as a regulated power supply, the effect being to hold constant the operating points of the transistors.

At frequencies in the upper pass band, that is those above $f1$, the gain is determined by $$\frac{(R53+R58)}{(R58)}$$

and can be set in useful values, for example between about 50 and 100, with ordinary transistors. In this frequency range the circuit behaves as an ordinary feedback amplifier. However, the major advantages realized with this circuit are its simplicity and high performance. The usual high capacitance coupling capacitors are not required and the amplifier is virtually free of temperature effects, and other drifts. The input impedance of this embodiment of the doublet amplifier of this invention is relatively high, on the order of 100K. It has direct application as a voltage amplifier.

Referring now to FIGURE 12 the doublet amplifier of this invention is shown with an alternative arrangement for providing negative A.C. feedback. The basic circuit includes stages Q20 and Q21 and is analogous to the doublet amplifier described in FIGURE 9. However, A.C. feedback is provided from the emitter of output stage Q21 through series connected capacitors C43 and resistance R31 to the base of Q20. This depresses the lower half power point and reduces the input impedance. The same advantages described above for the amplifier of FIGURE 11 are obtained in the FIGURE 12 modification. In this case the amplifier has a rather low input impedance and is applicable to current amplifying application.

FIGURE 13 is a graph showing as curve 100 the variation in gain as a function of signal frequency for the doublet amplifier of this invention as illustrated in FIGURES 6, 11, and 12 discussed above and showing the low and high frequency pass bands noted. Curve 100 is divided into essentially three regions. There is the low frequency pass band at frequencies below $f1$ and break point 104 on the curve. There is the high frequency pass band at frequencies between $f1$ and $f2$ and break points 102 and 104. There is the higher frequency region above $f2$ and point 104 where the gain drops off with increasing frequency due to the frequency limits of the transistors. In the low frequency pass band the circuit behaves, as previously stated, as a regulated power supply to fix the operating points of the transistors. The gain level here is fixed at a relatively low level of about 5, for example, by the D.C. feedback. In the high frequency pass band the A.C. feedback limits the gain at a substantially constant value, at about 100 for example, over a relatively wide frequency range. Broken curve 106 extending through the central region illustrates the variation in gain with frequency in the doublet amplifier of this invention when the A.C. feedback loop is open as in FIGURES 8, 9 or 10. Frequency $f3$ is the lower frequency limit of A.C. feedback as defined above and dependent upon values of $R_{eq}$ and C42.

Referring again briefly to FIGURE 11, the doublet amplifier of this invention may in some cases be fed with a current signal which, when multiplied by the current gain of stages Q20 and Q21, produces currents in the output stage Q21 which may lead to excessive dissipation at the collector of that stage. Such a situation is particularly true if the input stage Q20 under particular operating conditions has a substantial quiescent (zero signal) operating current. Representative of such conditions is the circuit previously described in FIGURES 6 and 10 where two doublet amplifiers according to the invention are connected in cascade.

In order to avoid destructive currents in the output stage of the amplifier of this invention, the component of the output stage current corresponding to the input stage quiescent current multiplied by its amplification factor is desirably prevented from flowing in the output stage. In the present invention this has been accomplished by shunting this amplified input stage quiescent current from the collector-base connection between the stages to ground.

A partially effective shunt of this amplified current may be effected by connecting a resistance, as shown in FIGURE 11a, directly between the collector-base interstage connection at point 108 to A.C. ground represented by point 110 in FIGURE 11. A substantial reduction in output stage current is achieved. However, some current must necessarily bypass this shunt resistance through the output transistor stage since the impedance of a pure resistance is equal for direct and alternating current signals.

A somewhat higher degree of selective shunting of this amplified quiescent current may be realized by providing an inductive reactance, as shown in FIGURE 11b, as shunt between points 108 and 110. This provides a higher impedance in the shunt circuit to the relatively high frequency amplified signal current and yet provides a relatively low impedance path to current for the amplified quiescent current.

FIGURE 14 is a schematic circuit diagram of the doublet amplifier of this invention provided with a third shunt circuit for the amplified quiescent current. The circuit of FIGURE 14 is identical to that of FIGURE 11 to which has been added a grounded base transistor stage Q22 connected in series with resistance R54 between points 108 and 110. The operating bias voltage for the base of Q22 is provided with resistances R62 and R63. The dynamic resistance of the collector of grounded base transistor stage Q22 acts in this circuit to provide a return path around output stage Q21 for the amplified quiescent current. Amplifiers based on the circuit of FIGURE 14 can provide current gains on the order of 4,000. No signal current can flow through the shunt stage Q22 and its presence does not lower the open loop current gain. The valve of resistance R62 may be varied to set the zero operating point of the amplifier. The voltage gain is in the order of 1.3–1.7 depending upon the relative values of the resistances R62 and R63. The input impedance of this amplifier is about 300 K., the output impedance is about 400 ohms matching some relatively low impedance transmission lines. Even with current gains of the order given, shunt stage Q22 prevents the output stage currents from rising to destructive values.

In the circuit of FIGURE 14 A.C. feedback is provided by resistances R53 and R58 and capacitance C40. This is the A.C. feedback arrangement previously described in FIGURE 11. It will be noted that if the alternative A.C. feedback connection of FIGURE 12, including resistances R60 and R61 and capacitance C43, is substituted for the R58 A.C. feedback resistance in the circuit of FIGURE 14, the doublet current amplifier becomes analogous to the high gain Q14–Q15 including shunt stage Q16 at the output of the current pulse amplifier shown in FIGURE 6.

Referring now to FIGURE 15 a schematic circuit diagram of a power amplifier embodying the doublet amplifier of this invention is shown. The power amplifier includes at its input the doublet amplifier of this invention including stages Q23 and Q24 corresponding closely to the circuit shown in FIGURE 11 with two changes subsequently discussed, and a class A output stage including transistors Q25 and Q26 connected in an emitter follower configuration. The two changes referred to involve the source of signal in D.C. and A.C. feedback loops. In this amplifier these sources are the output of the emitter follower stage. The D.C. feedback is provided by the connection including resistance R74 connecting the collector-emitter junction of the follower stages Q25 and Q26 to the A.C. ground point between resistances R67 and R52 in input stage Q23. This is a particularly good feature in this circuit because the quiescent current in Q25–Q26 may be relatively high, on the order of an ampere or so, and the follower stage Q25–Q26 ordinarily tends to thermal runaway. The circuit of FIGURE 15, however, is quite stable and the D.C. voltage at the common junction of Q25–Q26 may normally be set at about one-half of the supply voltage by means of input divider resistors including R65 and R66. A.C. feedback in the pass band is provided by resistances R70 and R67 isolated by capacitors C45 and C46, and connected from the output of the emitter follower stages Q25–Q26 to the emitter of input stage Q23. The breakdown diode 112 connected between the collector of Q25 and the base of Q26 in the output follower stage serves to couple signal at the proper D.C. voltage level to the base of Q26. The input signal is applied at terminal 111. With typical germanium 10 watt power transistors at Q25–Q26 it has been found possible to supply 40 watts peak power at terminal 117 into an 8 ohm load with a flat frequency response from about 2 c.p.s. (cycles per second) to about 30,000 c.p.s.

Referring now to FIGURE 16, a schematic circuit diagram is shown of the doublet amplifier of this invention driving a class B push-pull amplifier delivering an output signal at terminal 115 into a very low impedance load. The doublet amplifier of this invention consists of stages Q26 and Q28 and the class B stage includes transistor Q29, Q30, Q31, and Q32. The doublet input stage Q27–Q28 has been previously described. The input signal is applied at terminal 113. D.C. feedback is provided by resistance R82 and the serially connected resistances R83, R52, and R85. A.C. feedback, however, is provided in the manner described in connection with FIGURE 15, that is from the output of the class B stage by means of resistances R86 and R85 isolated by capacitance C51. Capacitance C40 and resistance R52 are provided for the same purposes previously described.

In the class B stage, Q31 and Q32 corresponds to the doublet amplifier of this invention, while Q29–Q30 is a Darlington cascade emitter follower circuit.

Referring now to FIGURE 17, the doublet amplifier according to this invention is shown applied to amplifying service utilizing the well known reflex principle. The doublet amplifier including stages Q33 and Q34 is shown connected at its output into a band pass filter 114 and a detector or demodulator 116. The output signal is taken from filter 114 at 118 and the demodulator 116 output is returned to input terminal 120. The input signal applied to terminal 120 in this service consists of carrier frequency modulated at some lower frequency. Both of these signals are amplified by the doublet amplifier Q33–Q34 and fed simultaneously to band pass filter 114 and demodulator 116. The filter 114 will not pass the modulated carrier signal to the output. Demodulator 116 produces a modulation signal which is returned to input of Q33 by means of connection 122 shown. This modulation signal is amplified, in Q33–Q34, passed through filter 114, and appears at output terminal 118.

By means of this application of the doublet amplifier of the present invention, the gain provided for signals at the carrier frequency and the gain provided for modulation frequency signals may be made substantially different and yet are amplified simultaneously in the same amplifier, Q33–Q34. The carrier frequency signal gain provided by this circuit is substantially equal to $$\frac{(R91+R89)}{(R89)}$$

and this may be made quite high, on the order of 1000. The modulation signal frequency gain is substantially equal to $$\frac{(R89+R52+R91)}{(R89)}$$

and this may be made quite small, for example on the order of 5. The low frequency pass band of the amplifier, in addition to its use to control the operating points of the transistors by applying a voltage reference at the base of the input stage, is also used for amplification of the low frequency or modulation signals. In the high frequency pass band, the carrier frequency is also amplified, but at a substantially higher gain. The modulation signal amplitude effects the degree of D.C. feedback and thus causes the transistors operating point to vary slightly on either side of the desired operating point. There are many applications where this deviation is of no consequence. A primary advantage resulting from the use of reflux circuits of this type is in the substantial reduction in the number of transistors required.

Referring finally to FIGURE 18, another embodiment of the doublet amplifier of this invention in reflex service is shown. The system consists of doublet amplifier stages Q35 and Q36. The input signal applied at terminal 130 through coupling capacitor C60 is modulated by modulator 132. The modulated signal is applied through capacitor C61 to the input of the doublet amplifier. The amplified output signal is passed through low pass filter 134. The signal from low pass filter 134 is applied to capacitor C63 and appears at the output at output terminal 136 and is registered on a readout device 138. Demodulator 140 is isolated from the doublet amplifier output by means of capacitance C62 and is connected to the input of the doublet amplifier. A.C. feedback is provided by means of a suitable feedback circuit 142 connected from the output of low pass filter 134 to the input of modulator 132.

The circuit of FIGURE 18 can for example be applied for the measurement of voltages. In such service the modulation frequency is conveniently set at 100,000 c.p.s. with a low frequency band pass filter set at 10,000 c.p.s. Input signals applied at terminal 130 modulate the 100,000 c.p.s. carrier. The resultant modulated signal is amplified in the doublet amplifier Q35–Q36 and is demodulated in demodulator 140 to produce an amplified low frequency signal. This signal is amplified again in the doublet amplifier Q35–Q36, and is applied through low pass filter 134 to a sensor such as readout device 138 at output 136. The gains in the two frequency pass bands are determined by the relative values of resistances R92, R93, R52 and capacitance C40. The overall gain in system is controlled by feedback loop 142. In one application of this circuit as a log current amplifier, the overall feedback circuit 142 includes a logarithmic element, such as a diode operated in the range where the voltage drop across the diode is proportional to the current flow through it, i.e., $$e = k \log i$$

Again the economy of transistors realized in reflex circuits is evident from the foregoing description of FIGURE 18.

Several specific embodiments of this invention have been described above in considerable detail by way of illustration. It should be understood that various other embodiments, modifications, and adaptations thereof may be made by those skilled in the art without departing from the spirit and scope of the invention as defined in the following claims.

We claim:
1. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, and means consisting of third resistance and a capacitance in parallel connecting the emitter of the first stage to the common potential terminal.

2. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means consisting of a third resistance and a capacitance in parallel connecting the emitter of the first stage to the common potential terminal, and a fourth resistance and a capacitance in series connecting the emitter of the second stage to the base of the first stage.

3. A doublet transistor amplifier which comprises a first and a second transistor stage having transistors of opposite polarity and each connected in a common emitter configuration, the collector of said first stage being directly connected to the base of the second stage, terminals for connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, and means comprising a third resistance and a capacitance in parallel connecting the emitter of the first stage to the common potential terminal.

4. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, and means comprising a third resistance and a capacitance in parallel with only a part of said third resistance connecting the emitter of the first stage to the common potential terminal.

5. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel connecting the emitter of the first stage to the common potential terminal, and means for shunting amplified quiescent current of said first stage around said second stage from the collector of said first stage to the other potential terminal.

6. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel connecting the emitter of the first stage to the common potential terminal, and a current shunt transistor stage connected in grounded base configuration with its emitter connected to the other potential terminal and its collector connected to the collector of said first stage of said doublet to by-pass amplified quiescent current of said first stage around said second stage.

7. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel with only a part of said third resistance connecting the emitter of the first stage to the common potential terminal, and a current shunt transistor stage connected in grounded base configuration with its emitter connected to the other potential terminal and its collector connected to the collector of said first stage of said doublet to by-pass amplified quiescent current of said first stage around said second stage.

8. A doublet transistor amplifier which comprises a first and a second transistor stage having transistors of opposite polarity and each connected in a common emitter configuration, the collector of said first stage being directly connected without any intervening impedance element to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel connecting the emitter of the first stage to the common potential terminal, and a fourth resistance connected from the collector of said first stage to the other potential terminal to shunt amplified quiescent current of said first stage around said second stage.

9. A doublet transistor amplifier which comprises a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel connecting the emitter of the first stage to the common potential terminal, and an inductive reactance connected from the collector of said first stage to the other potential terminal to shunt amplified quiescent current of said first stage around said second stage.

10. A transistor amplifier which comprises a doublet transistor amplifier connected to drive an output amplifier; said doublet amplifier comprising a first and a second transistor stage having transistors of opposite polarity and each connected in a common emitter configuration, the collector of said first stage being directly connected without any intervening impedance elements to the base of the second stage and having terminals connecting said doublet and output amplifiers to a source of operating potential, a first resistance connected between said terminals, a signal input terminal connected to an intermediate point on said first resistance and to the base of said first stage, a signal output terminal connected to the output of said output amplifier, a second resistance and capacitance in series connecting the output of said output amplifier to the emitter of the first stage, and means comprising a third-resistance and a capacitance in parallel connecting the emitter of the first stage to the common potential terminal.

11. A transistor amplifier adapted for reflex service which comprises a doublet transistor amplifier having a first and a second transistor stage having transistors of opposite polarity and each connected in a common emitter configuration, the collector of said first stage being directly connected without any intervening impedance elements to the base of the second stage and having terminals connecting said doublet amplifier to a source of operating potential, a first resistance connected between said terminals, a signal input terminal connected to an intermediate point on said first resistance and to the base of said first stage, a signal output terminal connected to the collector of said second stage, a second resistance connecting the collector of the second stage to the emitter of the first stage, means comprising a third resistance and a capacitance in parallel connecting the emitter of the first stage to the common potential terminal; a demodulator and a low pass filter connected to the collector of the second stage of said doublet amplifier, means connecting the output of said demodulator to the input of said first stage of said doublet amplifier, and an output terminal connected to the output of said low pass filter.

References Cited by the Examiner

UNITED STATES PATENTS

| | | | |
|---|---|---|---|
| 2,246,331 | 6/1941 | White et al. | 330—53 |
| 2,252,613 | 8/1941 | Bingley | 330—53 |
| 2,668,883 | 2/1954 | Hurford | 330—53 |
| 2,728,874 | 12/1955 | Morgan | 330—53 X |
| 2,733,303 | 1/1956 | Koenig | 330—32 |
| 2,824,238 | 2/1958 | Stellmacher | 250—83.6 |
| 2,900,456 | 8/1959 | Davidson | 330—19 |
| 2,963,656 | 12/1960 | Pariss | 330—17 |
| 2,993,995 | 7/1961 | Pinckaers | 250—83.6 |
| 3,001,144 | 9/1961 | Dandl | 330—32 |
| 3,008,091 | 11/1961 | Van Overbeek et al. | 330—17 |
| 3,042,875 | 7/1962 | Higgenbotham | 330—17 |

ROY LAKE, *Primary Examiner.*

RALPH G. NILSON, *Examiner.*

E. STRICKLAND, N. KAUFMAN, *Assistant Examiners.*